(12) United States Patent
Engelhard

(10) Patent No.: US 6,447,074 B2
(45) Date of Patent: Sep. 10, 2002

(54) PARKING BRAKE SYSTEM FOR MOTOR VEHICLES

(75) Inventor: Willibald Engelhard, Wernberg-Köblitz (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/784,757

(22) Filed: Feb. 15, 2001

(30) Foreign Application Priority Data

Feb. 15, 2000 (DE) ........................................ 100 06 656

(51) Int. Cl.⁷ ............................................. B60T 17/22
(52) U.S. Cl. ..................................................... 303/3
(58) Field of Search .......................... 303/3, 15, 20, 303/113.4, 114.1, 114.3, 155; 188/358, 359, 158, 159

(56) References Cited

U.S. PATENT DOCUMENTS 5,984,429 A * 11/1999 Neil et al. ............... 303/113.4
6,139,117 A * 10/2000 Shirai et al. ................... 303/3
6,226,586 B1 * 5/2001 Luckevich et al. ........... 701/70

FOREIGN PATENT DOCUMENTS

| DE | 19615186 C1 | 8/1997 |
| DE | 19838886 A1 | 10/1999 |
| DE | 19826687 A1 | 12/1999 |

* cited by examiner

Primary Examiner—Christopher P. Schwartz
(74) Attorney, Agent, or Firm—Laurence A. Greenberg; Werner H. Stemer; Gregory L. Mayback

(57) ABSTRACT

A parking brake system for a motor vehicle has a control for activating the parking brake, an electrical parking brake control unit for controlling braking devices which are assigned to the parking brake, a brake booster function control unit for controlling brake booster functions which promote traveling comfort and safety. When the control is activated at a vehicle velocity above a predefined minimum velocity, the braking devices assigned to the service brake are controlled by the brake booster function control unit.

4 Claims, 1 Drawing Sheet

PARKING BRAKE SYSTEM FOR MOTOR VEHICLES

BACKGROUND OF THE INVENTION

Field of the Invention

The invention relates to a parking brake system for motor vehicles. The parking brake system has a control for activating a parking brake function, a first control unit for activating a braking device and assigned to a parking brake, and a second control unit for activating the braking device and assigned to a service brake. The second control unit controls brake booster functions that promote traveling comfort and safety.

In addition to a known service brake system (service brake) which is actuated by a foot pedal, legislation requires a parking brake system (parking brake)—frequently also referred to as a handbrake. Such a parking brake is configured so as to be largely independent of the service brake of the motor vehicle and is used, on the one hand, to secure the motor vehicle in a stationary state (static activation) and on the other hand to brake the vehicle while traveling (dynamic activation). Dynamic activation may be necessary when the service brake fails, for example. Conventional vehicles are predominantly equipped with manually activated parking brakes. The parking brake is engaged or released in a metered fashion by a Bowden cable using a brake lever that is usually disposed in the center console. Foot-activated parking brakes that are engaged in a metered fashion by a foot pedal and released instantaneously by a release lever are also known. Metered release of the parking brake is not possible with foot-activated systems.

Both manually activated and foot-activated parking brakes have the disadvantage that the operator of the motor vehicle must apply an appreciable force at least to engage the parking brake. In addition, the brake lever or the foot pedal takes up a large amount of space in the center console or in the pedal region.

In order to overcome this disadvantage, electrical parking brakes—referred to below as electrical parking brakes or EPB for short—are known which are activated with little application of force by controls, for example by switching a key. The controls are advantageously disposed in the dashboard region or steering wheel region. Such an electrical parking brake is known from Published, Non-Prosecuted German Patent Application DE 198 38 886 A1.

When the parking brake is activated dynamically, that is to say the control is activated while the vehicle is traveling, controlled braking of the vehicle must be ensured even when the vehicle is traveling at a high velocity and wheel slip is occurring. The parking brake must therefore by necessity be controlled as a function of the travel situation. For this purpose, in the known parking brake the wheel speeds are transmitted to the control unit of the parking brake and evaluated there. Effective control can be achieved in such a case only by complex algorithms such as are known in anti-lock braking systems. However, this entails high additional costs.

Published, Non-Prosecuted German Patent Application DE 198 26 687 A1 discloses an electrically activated brake system for motor vehicles in which, by activating a parking brake control, the service brake system is activated above a predefined vehicle velocity and the parking brake system is activated below the predefined vehicle velocity.

SUMMARY OF THE INVENTION

It is accordingly an object of the invention to provide a parking brake system for motor vehicles which overcomes the above-mentioned disadvantages of the prior art devices of this general type, in which controlled braking of the motor vehicle is ensured at low cost when the parking brake is activated dynamically.

With the foregoing and other objects in view there is provided, in accordance with the invention, a parking brake system for a motor vehicle. The parking brake system includes a braking device, a control for activating a parking brake function, a first control unit for activating the braking device and assigned to a parking brake, the first control unit is connected to the control, and a second control unit for activating the braking device and assigned to a service brake. The second control unit is connected to the control and controls brake booster functions which promote traveling comfort and safety. If the control is activated at a vehicle velocity above a predefined minimum velocity and below a predefined maximum velocity, the braking device is activated by the first control unit and by the second control unit. The braking pressures or braking forces are predefined by the second control unit as a function of a braking effect achieved by the first control unit.

In order to achieve continual improvements in safety and to increase the traveling comfort and operating convenience, more and more vehicles are being equipped with brake booster functions such as an electrical stability program (ESP), a traction control system (ASR) or electrical differential lock (EBS) system. Such booster functions can also be used to generate a braking force or a braking pressure at the braking device of the service brake, and thus achieve a braking effect, without activating the service brake pedal. Evaluations, for example of the wheel speeds, which permit the motor vehicle to be braked as a function of a travel situation, are carried out in any case in the control units of such brake booster functions. According to the invention, when the parking brake control is activated while the vehicle is traveling the braking device assigned to the service brake is activated by the control unit of such a brake booster function. In order to do this, the brake actuators which are responsible for generating the braking force or the braking pressure at the brake device are controlled. As a result, the parking brake function is easily assumed by the service brake while the vehicle is traveling. However, in particular the functionality of the control unit of the brake booster function is utilized to control the actuators for the braking device on an individual basis and as a function of a travel situation.

In accordance with an added feature of the invention, the second control unit is programmed to: initiate and control an electrical stability program; initiate and control a traction control function; and initiate and control an electrical differential locking function.

In accordance with an additional feature of the invention, a first signal line connects the control to the first control unit, and a second signal line connects the control to the second control unit.

In accordance with a concomitant feature of the invention, a first signal line connects the control to the first control unit, and a second signal line connects the first control unit to the second control unit. A parking brake request signaled by activating the control is transmitted from the first control unit to the second control unit through the second signal line.

Other features which are considered as characteristic for the invention are set forth in the appended claims.

Although the invention is illustrated and described herein as embodied in a parking brake system for motor vehicles, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
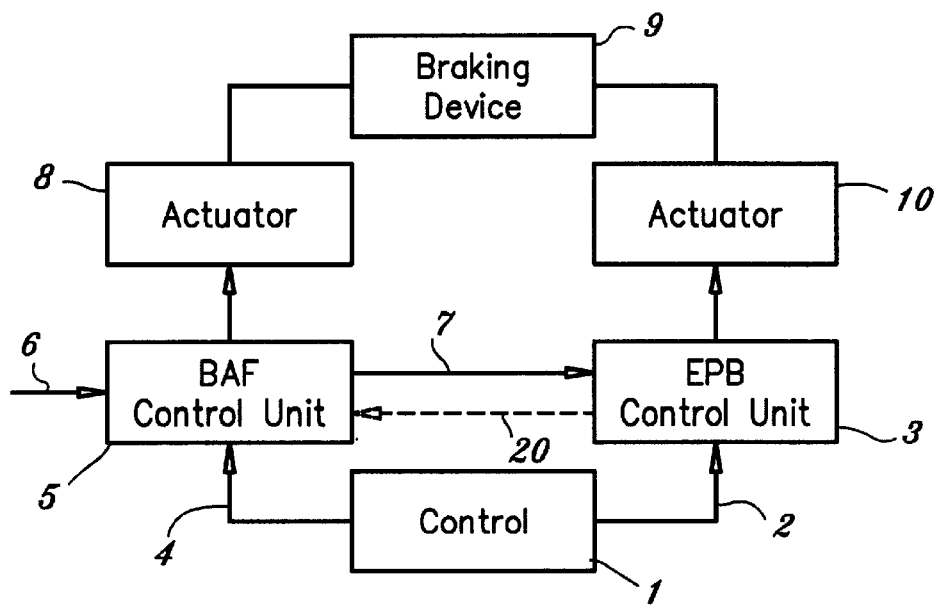
FIG. 1 is a block circuit diagram of a parking brake system with a hydraulic service brake according to the invention.

In all the figures of the drawing, sub-features and integral parts that correspond to one another bear the same reference symbol in each case. Referring now to the figures of the drawing in detail and first, particularly, to FIG. 1 thereof, there is shown a parking brake system according to the invention. The parking brake system has a control 1 for activating a parking brake function. The control 1 may be embodied, for example, as a single push-button key that merely discriminates between the states "activated" and "not activated". Likewise, the control 1 may also be embodied as a double push-button key with the states "engage", "release" and a "home position". The selection of the control 1 here is mainly dependent, as is its configuration in the interior of the vehicle, on criteria relating to comfort and ergonomics. For safety reasons, the motor vehicle is preferably equipped with a further control (redundancy principle) which is not illustrated. A parking brake request from a driver which is signaled by activating the control 1 is transmitted through a signal line 2 to a first control unit 3 being an electrical parking brake control unit or EPB control unit 3 for short. The parking brake request of the driver is transmitted from the control 1 through a signal line 4 to a second control unit 5 being a brake-booster function-control unit or BAF control unit 5 for short. As an alternative to parallel reading-in of the parking brake request by the EPB control unit 3 and the BAF control unit 5, the parking brake request can also be passed on from the EPB control unit 3 to the BAF control unit 5 via a further signal line 20, for example in the form of a controller area network (CAN) bus shown by the dashed line in FIG. 1.

Brake booster functions which promote safety or comfort, such as for example an electrical stability program and/or a traction control (ASR) and/or an electrical differential lock (EDS), are controlled using the BAF control unit 5. To control such brake booster functions, further signals which characterize the travel situation, for example the wheel speeds, are necessary. This information is transmitted to the BAF control unit 5 from sensors (not illustrated) or other control units via one or more signal lines 6. A variable which characterizes a velocity of the motor vehicle, for example wheel speeds or the actual velocity of the vehicle calculated therefrom, is transmitted from the BAF control unit 5 to the EPB control unit 3 through one or more signal lines 7 (redundancy principle). The BAF control unit 5 controls a service brake actuator 8 by which a desired brake pressure or a desired braking force is set at a braking device 9. When the service brake is a hydraulic one, the service brake actuator 8 is embodied for example as a hydraulic unit via which the hydraulic pressure at the braking device 9 is controlled. The braking device 9 can be embodied here as disc brakes or drum brakes. For reasons of clarity, only a single braking device 9 is illustrated in FIG. 1 by way of example. However, in reality, each wheel of the motor vehicle is preferably assigned its own braking device 9.

In motor vehicles with a hydraulic service brake, mechanically activated parking brakes are generally used. In such brakes, the EPB control unit 3 controls a parking brake actuator 10 which is connected to at least two of the braking devices 9 of the motor vehicle via Bowden cables. The braking devices 9 in question here are usually those that are mounted on the two front wheels or on the two rear wheels. The parking brake actuator 10 is embodied, for example, as an inexpensive D.C. brush motor with a self-locking spindle gear mechanism. The self-locking of the spindle gear mechanism also ensures the securing effect of a parking brake with mechanical devices as is legally required.

Figure 2:
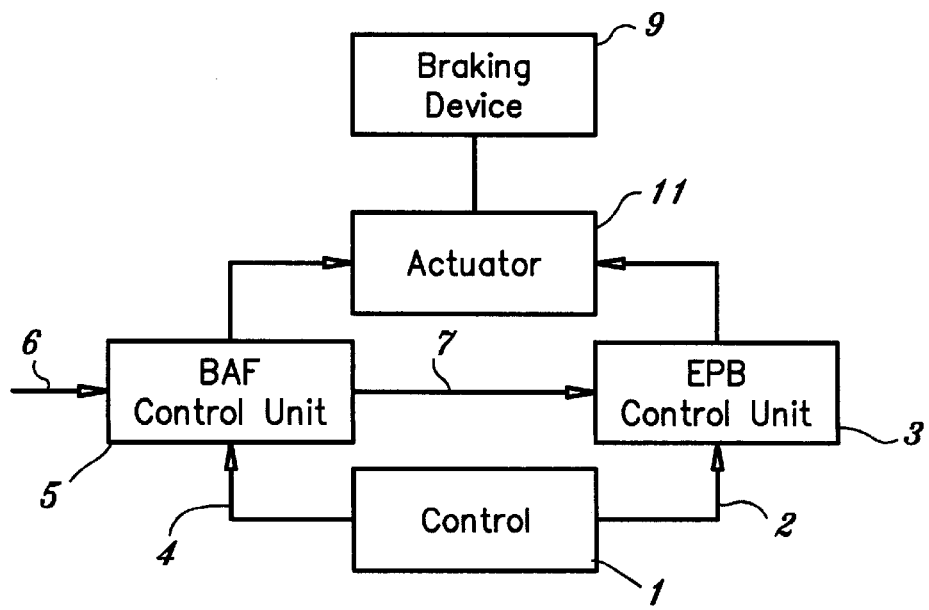
FIG. 2 is a block circuit diagram of the parking brake system for a motor vehicle with an electric service brake.

In motor vehicles with an electric service brake (FIG. 2)—also referred to using the term "brake by wire"—there is no need for separate actuators for activating the service brake and the parking brake. Both the EPB control unit 3 and the BAF control unit 5 are connected to a wheel brake actuator 11 in such brake systems. For the sake of simplification, only a single wheel brake actuator 11 with the associated braking device 9 is illustrated in FIG. 2. The wheel brake actuators 11 are usually embodied as self-locking electric motor/gear mechanism units that are preferably disposed directly on the wheels. A brake system with such wheel brake actuators is known, for example, from German Patent DE 196 15 186 C1.

The function of the parking brake system according to the invention is explained in more detail below.

After the control 1 is activated for a brief time in the stationary state of the motor vehicle, the braking devices 9 assigned to the parking brake are engaged with a predefined time profile and with a predefined maximum force using the EPB control unit 3 by use of the parking brake actuators 10—or the wheel brake actuators 11 in the case of electric brake systems. In order to prevent the motor vehicle from rolling away, for example when parked on an incline, a high actuator speed, which causes the braking devices 9 to be engaged quickly, is predefined here. The maximum force is advantageously specified as a function of the angle of inclination of the slope. After the control 1 is activated again for a brief time, the braking devices 9 assigned to the parking brake are instantaneously released. In order to avoid the parking brake from being released unintentionally in the stationary state, the state of the ignition device, for example, may additionally be evaluated in the EPB control unit 3.

After the control 1 has been briefly activated at a vehicle velocity below a predefined minimum velocity (for example in the range from 3 to 5 km/h), the braking devices 9 assigned to the parking brake are engaged in a way analogous to the activation of the control 1 in the stationary state. After the control 1 is activated again (system off), the braking devices 9 are instantaneously released. The minimum velocity can be predefined here on a vehicle-specific basis, but is dependent on the measuring range of the velocity or wheel speed sensors used. With future active sensors, i.e. ones which sense velocities as far as 0 km/h, it is also possible to strictly separate the activation of the parking brake in the "stationary state" and while "traveling". To do this, the minimum velocity is simply fixed at the value 0 km/h.

After the control 1 has been activated at a vehicle velocity above the predefined minimum velocity, the braking devices 9 assigned to the service brake are engaged over the duration of the activation by the BAF control unit 5 by the service brake actuator 8—or the wheel brake actuators 11 in the case of electric brake systems. Here, the braking pressure or the braking force is specified individually for the individual braking devices 9 as a function of the wheel speeds and of the wheel slip that occurs. In this way, controlled braking of the motor vehicle is ensured even when the control 1 is activated at relatively high vehicle velocities. As soon as the control 1 is no longer activated, the braking devices 9 are instantaneously released. In a further embodiment, the braking devices 9 that are assigned to the service brake can also be engaged after a brief activation of the control at a vehicle velocity above the predefined minimum velocity by the BAF control unit 5 by use of the service brake actuators 8 or the wheel brake actuators 11. In this case, the braking devices 9 are not released again until the control 1 is activated again.

The braking devices 9 assigned to the parking brake are advantageously additionally activated by the EPB control unit 3 when the control 1 is activated at a vehicle velocity above the predefined minimum velocity but below a predefined maximum velocity (for example in the range from 7 to 10 km/h). Here, the functionality of the BAF control unit 5 is utilized to the effect that the braking pressures defined by the BAF control unit 5 or the predefined braking forces are specified as a function of the braking effect achieved by the EPB control unit 3. Such an overlapping control of the actuators for the braking device 9 has the advantage that communication, for example for mutual functional monitoring, between the EPB control unit 3 and the BAF control unit 5 is not necessary.

I claim:

1. A parking brake system for a motor vehicle, comprising:
    a braking device;
    a control for activating a parking brake function;
    a first control unit for activating said braking device and assigned to a parking brake, said first control unit connected to said control;
    a second control unit for activating said braking device and assigned to a service-brake, said second control unit connected to said control and controlling brake booster functions which promote traveling comfort and safety, if said control is activated at a vehicle velocity above a predefined minimum velocity and below a predefined maximum velocity, said braking device is activated by said first control unit and by said second control unit, one of braking pressures and braking forces being predefined by said second control unit as a function of a braking effect achieved by said first control unit.

2. The parking brake system according to claim 1, wherein said second control unit is programmed to:
    initiate and control an electrical stability program;
    initiate and control a traction control function; and
    initiate and control an electrical differential locking function.

3. The parking brake system according to claim 1, including:
    a first signal line connecting said control to said first control unit; and
    a second signal line connecting said control to said second control unit.

4. The parking brake system according to claim 1, including
    a first signal line connecting said control to said first control unit; and
    a second signal line connecting said first control unit to said second control unit, a parking brake request signaled by activating said control being transmitted from said first control unit to said second control unit through said second signal line.

* * * * *